United States Patent
Murray et al.

(10) Patent No.: US 9,830,816 B1
(45) Date of Patent: Nov. 28, 2017

(54) ANTENNA VALIDATION FOR VEHICLE-TO-VEHICLE COMMUNICATION

(71) Applicant: Ford Global Technologies, LLC, Dearborn, MI (US)

(72) Inventors: Allen R. Murray, Lake Orion, MI (US); Oliver Lei, Windsor (CA)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/336,653

(22) Filed: Oct. 27, 2016

(51) Int. Cl.
  *G08G 1/00* (2006.01)
  *G08G 1/0967* (2006.01)
(52) U.S. Cl.
  CPC .............................. *G08G 1/096791* (2013.01)
(58) Field of Classification Search
  CPC ........ G08G 1/096791; G08G 13/2471; H04W 4/02; G01S 3/48; G01S 5/0072
  USPC ...... 340/902, 505, 514, 539.1, 539.21, 10.4; 455/456.1; 370/312
  See application file for complete search history.

(56) References Cited

U.S. PATENT DOCUMENTS

| | | | |
|---|---|---|---|
| 5,777,565 A | 7/1998 | Hayashi et al. | |
| 6,356,207 B1 | 3/2002 | Oouchi | |
| 8,520,695 B1 * | 8/2013 | Rubin | G08G 9/02 370/337 |
| 8,774,012 B2 | 7/2014 | Sakamoto et al. | |
| 2012/0028662 A1 | 2/2012 | Nagai et al. | |
| 2013/0165146 A1 * | 6/2013 | Stahlins | G01S 3/30 455/456.1 |
| 2015/0035067 A1 | 2/2015 | Zhang et al. | |

* cited by examiner

*Primary Examiner* — Toan N Pham
(74) *Attorney, Agent, or Firm* — James P. Muraff; Neal, Gerber & Eisenberg LLP (57) ABSTRACT

Systems, methods and apparatus are disclosed for antenna validation for vehicle-to-vehicle communication. An example disclosed vehicle includes a wireless communication module and an antenna calibrator. The example antenna calibrator, for each of a plurality of validation responses received from second vehicles (a) determines an estimated received signal strength based on an estimated open path signal strength loss, and (b) in response to a difference between the estimated received signal strength and an actual received signal strength from the validation response not satisfying a threshold, provides an alert to occupants of the vehicle.

19 Claims, 5 Drawing Sheets

ANTENNA VALIDATION FOR VEHICLE-TO-VEHICLE COMMUNICATION

TECHNICAL FIELD

The present disclosure generally relates to vehicle-to-vehicle communication and, more specifically, antenna validation.

BACKGROUND

A vehicle-to-everything (V2X) communication network is being deployed as a part of the Intelligent Transportation System. The V2X communication network has many forms. Vehicle-to-vehicle (V2V) communication facilitates vehicles communicating with other vehicles to coordinate driving maneuvers and provide warnings about potential road hazards. Additionally, vehicle-to-infrastructure (V2I) communication facilitates communicating with infrastructure-based nodes, such as toll booths and traffic signals. Vehicle-to-pedestrian (V2I) communication facilitates communicating with mobile devices used by pedestrians. The aim of deploying the vehicle-to-everything (V2X) communication network is to reduce fatalities, injuries, property destruction, time lost in traffic, fuel consumption, exhaust gas exposure, among others.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for antenna validation for vehicle-to-vehicle communication. An example disclosed vehicle includes a wireless communication module and an antenna calibrator. The example antenna calibrator, for each of a plurality of validation responses received from second vehicles (a) determines an estimated received signal strength based on an estimated open path signal strength loss, and (b) in response to a difference between the estimated received signal strength and an actual received signal strength from the validation response not satisfying a threshold, provides an alert to occupants of the vehicle.

An example disclosed method to test an antenna of a vehicle-to-vehicle communication module includes determining an estimated received signal strength based on an estimated open path signal strength loss. The example method also includes, in response to a difference between the estimated received signal strength and an actual received signal strength from the validation response not satisfying a threshold, providing an alert to occupants of the vehicle.

An example system includes a plurality of first vehicles and a second vehicle. The example first vehicles, in response to receiving a validation request message, broadcast validation response messages including first coordinates of the corresponding first vehicle and a received signal strength value of the validation request message measured by the corresponding first vehicle. The second vehicle (a) from time to time, determines second coordinates of the second vehicle and sends the validation request message, and (b) for each of the received validation responses messages, determines an indication of operational status of an antenna of the second vehicle based on the second coordinates, the first coordinates, and the received signal strength value.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

An antenna for vehicle-to-everything (V2X) communication is mounted on the roof of a vehicle with a transmission arc of 360 degrees. Drivers often assume that the antenna is functioning normally. However, the antenna may be malfunctioning and not broadcasting messages at an expected power level or receiving messages broadcast by other vehicles. As a result, safety and/or coordination messages may not be transmitted/received. As disclosed below, a vehicle coordinates with other vehicles to validate that the antenna of the vehicle is functioning. The vehicle validating its antenna (sometimes referred to as the "requesting vehicle") (a) determines its location, and (b) broadcasts a validation request message with an identifier. A vehicle within range (sometime referred to as the "responding vehicle") that receives the validation request (a) determines its location and (b) determines the received signal strength of the validation request message. The responding vehicle broadcasts a response message which includes its location at which it received the validation request message, the received signal strength, and the identifier.

After receiving the response message, the requesting vehicle determines an expected signal loss based on the distance between the transmitting vehicle and the responding vehicle when the validation request message. Additionally, the requesting vehicle determines an actual signal loss based on the transmission power at which the validation request message was sent and the received signal strength included in the response message. The requesting vehicle compares the actual signal loss to the expected signal loss. If the difference between the actual signal loss and the expected signal loss satisfies (e.g., is greater than) a threshold (e.g., ±6 dBm, etc.), the requesting vehicle increments a failure counter. However, if the difference between the actual signal loss and the expected signal loss does not satisfy the threshold, the requesting vehicle increments a success counter. After receiving at least a threshold number of response messages from different responding vehicles, the requesting vehicle calculates a success ratio based on the failure counter and the success counter. The requesting vehicle determines whether its antenna is operable based on the success ratio.

Figure 1:
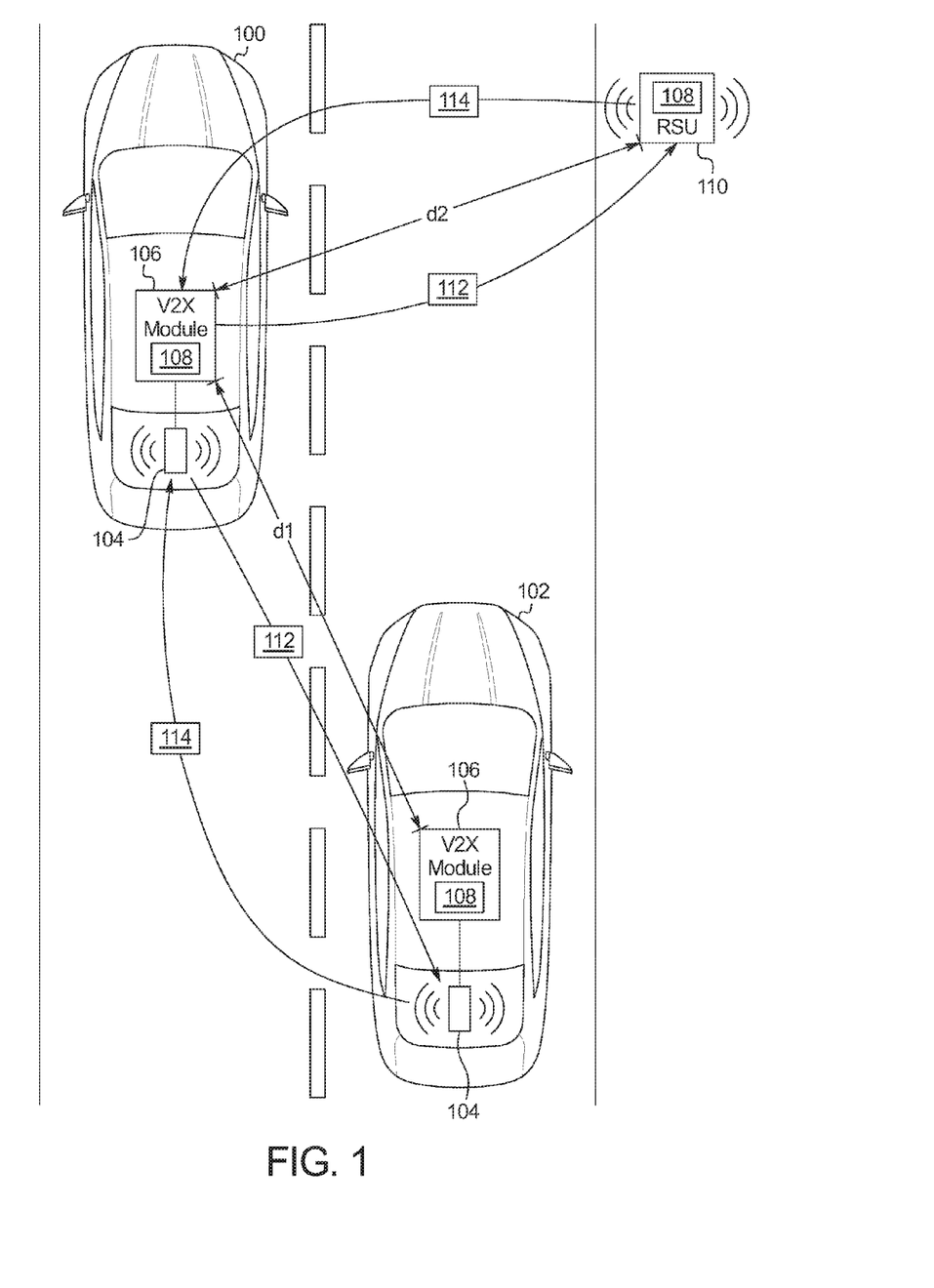
FIG. 1 illustrates vehicles validating and calibrating their antennas in accordance with the teachings of this disclosure.

FIG. 1 illustrates vehicles 100 and 102 validating and calibrating their antennas 104 in accordance with the teachings of this disclosure. The vehicles 100 and 102 may be a standard gasoline powered vehicle, a hybrid vehicle, an electric vehicle, a fuel cell vehicle, and/or any other mobility implement type of vehicle. The vehicles 100 and 102 include parts related to mobility, such as a powertrain with an engine, a transmission, a suspension, a driveshaft, and/or wheels, etc. The vehicles 100 and 102 may be non-autonomous, semi-autonomous (e.g., some routine motive functions controlled by the vehicles 100 and 102), or autonomous (e.g., motive functions are controlled by the vehicles 100 and 102 without direct driver input). In the examples disclosed below, one of the vehicles 100 is the requesting vehicle and the other vehicle 102 is the responding vehicle. However, either one of the vehicle 100 and 102 may be the requesting vehicle or the responding vehicle depending on which vehicle 100 and 102 is calibrating its antenna 104. So in operation, a vehicle 100 and 102 may be the requesting vehicle at times and the responding vehicle at other times. Additionally, while the illustrated example includes one responding vehicle 102, many responding vehicles 102 may be within range of the requesting vehicle 100. In the illustrated example the vehicles 100 and 102 includes the antenna 104, a vehicle-to-everything (V2X) module 106, and an antenna calibrator 108.

The antenna 104 is mounted to the vehicle 100 and 102. In some examples, antenna 104 is mounted on the roof of the vehicles 100 and 102 to achieve a 360 degree view around the vehicle. Wiring between the antenna and the V2X module 106 causes a loss of transmission power (sometimes referred to as "cable loss."). In some examples, the cable loss is measure through a calibration process that, for example, may be performed when the vehicle is manufactured. Alternatively, in some examples, the cable loss is estimated based on type of cable between the antenna 104 and the V2X module 106 and the length of the cable. For example, the estimated cable loss may be −3 decibel-milliwatts (dBm). The cable loss for the vehicle 100 and 102 is stored in memory (e.g., the memory 206 of FIG. 2 below).

The example V2X module 106 include radio(s) and software to communicatively couple the vehicles 100 and 102, infrastructure-based modules 110 (sometimes referred to as "roadside units (RSUs)"), and mobile device-based modules (not shown). The range of the V2X module 106 is based on a transmission power (often measured in dBm). The V2X module 106 includes a global positioning system (GPS) receiver and an inertial navigation system (INS) to share the location of the vehicles 100 and 102 and to synchronize the V2X modules 106 of the different vehicles 100 and 102. When the V2X module 106 receives a V2X message, the V2X module 106 measures a received signal strength indicative of the broadcast power of the signal of the message as it is received by the antenna 104 electrically coupled to the V2X module 106. The received signal strength is measure as a received signal strength indication (RSSI) and/or received transmission strength (RX). The RSSI is measured in signal strength percentage, the values (e.g., 0-100, 0-137, etc.) of which are defined by a manufacturer of hardware used to implement the V2X modules 106. Generally, a higher RSSI means that the requesting vehicle 100 is closer to the responding vehicle 102. The RX values are measured in dBm. For example, when the requesting vehicle is two meters (6.56 feet) away, the RX value may be −66 dBm.

DSRC is an implementation of a vehicle-to-everything (V2X) or a car-to-everything (C2X) protocol. Any other suitable implementation of V2X/C2X may also be used. Currently, the DSRC network is identified under the DSRC abbreviation or name. However, other names are sometimes used, usually related to a Connected Vehicle program or the like. More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA %20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones. Most of these systems are either pure DSRC or a variation of the IEEE 802.11 wireless standard. However, besides the pure DSRC system it is also meant to cover dedicated wireless communication systems between cars, which are integrated with GPS and are based on an IEEE 802.11 protocol for wireless local area networks (such as, 802.11p, etc.).

The example RSU 110 includes an infrastructure-to-vehicle (I2V) module that communicates with the vehicles 100 and 102 via the V2X protocol. The RSU 110 may be attached to infrastructure (e.g., traffic signals, buildings, bridges, etc.) or may be a standalone unit. The RSUs 110 may be calibrated from time-to-time (e.g., periodically, aperiodically, etc.) so that received signal strength measurement is accurate. The RSU 110 stores the date that it was calibrated in memory. The closer to the calibration date, the more confident the request vehicle can be that the received signal strength received from the RSU 110 is accurate.

The antenna calibrator 108 (a) broadcasts, via the V2X module 106 and the antenna 104, validation requests 112 to nearby vehicles 102 and the roadside units 110 to determine whether the antenna 104 is operating within expected parameters, and (b) broadcasts validation responses 114 in response to receiving the validation requests 112. From time to time (e.g., daily, weekly, monthly, etc.), the antenna calibrator 108 (e.g., of the requesting vehicle 100) validates the antenna 104. To initiate the validation, the antenna calibrator 108 (i) broadcasts the validation requests 112, and (ii) records (a) the coordinates of the requesting vehicle 100 and (b) the transmission power used to broadcast the validation requests 112. The validation request 112 includes an identifier that identifies the requesting vehicle 100.

For a responding vehicle 102, upon receipt of the validation requests 112, the antenna calibrator 108 (i) measures the RSSI and/or RX of the validation requests 112 and (ii) records the coordinates of the responding vehicle 102. The antenna calibrator 108 of the responding vehicle 102 then broadcasts the validation response 114. The validation response 114 includes the RSSI and/or RX value, the coordinates of the responding vehicle 102, and the identifier included in the validation requests 112. For a RSU 110, upon receipt of the validation requests 112, the antenna calibrator 108 measures the RSSI and/or RX of the validation requests 112. The antenna calibrator 108 of the RSU 110 then broadcasts the validation response 114. The validation response 114 includes the RSSI and/or RX value, the coordinates of the RSU 110, the identifier included in the validation requests 112, and the date store in memory indicative of when the RSU 110 was last calibrated.

The antenna calibrator 108 of the requesting vehicle 100 receives the validation responses 114 and discards the validation responses 114 that do not include the identifier for the requesting vehicle 100. Because the antenna calibrator 108 of the requesting vehicle 100 broadcasts the validation requests 112, it may receive validation responses 114 from multiple responding vehicles 102 and/or RSUs 110 in range. For the received validation responses 114, the antenna calibrator 108 determines a distance between the requesting vehicle 100 and the sender of the validation response 114 based on the coordinates of the requesting vehicle 100 stored by the antenna calibrator 108 and the coordinates of the responding vehicle 102 and/or RSUs 110 included in the validation responses 114. Based on the distance, the antenna calibrator 108 estimates an open path signal loss between the requesting vehicle 100 and the sender of the validation response 114. In some examples, the open path signal loss (in dBm) is calculated in accordance with Equation (1) below.

$$OSPL_E(dB) = 32.44 + 20 \log_{10}(d) + 20 \log_{10}(f) \quad \text{Equation (1)}$$

In Equation (1) above, $OSPL_E(dB)$ is the estimated open path signal loss in dB, d is the distance (in kilometers), and f is the frequency (in MHz). For example, if the distance between the requesting vehicle 100 and the responding vehicle 102 is 3 meters (0.03 kilometers, 9.84 feet) and the frequency of the V2X module 106 is 5.9 GHz (5900 MHz), the estimated open signal path loss ($OSPL_E(dB)$) may be −57.4 dB.

The antenna calibrator 108 determines an expected received signal strength (RSSE) based on (a) the transmission power of the validation request 112, (b) the estimated open path signal loss, and (c) the estimated or measure cable loss stored in memory. In some examples, the expected received signal strength (RSSE) is calculated in accordance with Equation (2) below.

$$RSSE = (TXP - CL) + OSPL_E(dB) \quad \text{Equation (2)}$$

In Equation (2) above, TXP is the transmission power of the validation requests 112, and CL is the cable loss stored in memory. For example, if the transmission power (TPX) is 28.8 dBm, the cable loss (CL) is 3 dBm, and the estimated open signal path loss ($OSPL_E(dB)$) is −57.4 dB, the expected received signal strength (RSSE) may be −31.6 dBm.

The antenna calibrator 108 compares a difference between the expected received signal strength (RSSE) and the received signal strength value in the validation response 114 to a signal loss threshold ($TH_{SL}$). The signal loss threshold ($TH_{SL}$) is determined based on anticipated measurement errors. For example, the antenna calibrator 108 of the responding vehicle may have a measurement tolerance of five percent when measuring the received signal strength value. For example, the signal loss threshold ($TH_{SL}$) may be ±6 dBm. In some examples, the antenna calibrator 108 may increase the signal loss threshold ($TH_{SL}$) when the weather, as detected by sensors (e.g., humidity sensors, barometers, rain sensors) of the requesting vehicle 100, that may increase the open path signal loss. In some examples, the antenna calibrator 108 compares a difference between the expected received signal strength (RSSE) and the received signal strength value (RSSV) in the validation response 114 to the deviation threshold ($TH_{SL}$) in accordance with Equation (3) below.

$$|RSSE - RSSV| \leq TH_{SL} \quad \text{Equation (3)}$$

If, for the validation response 114, Equation (3) above is satisfied, the antenna calibrator 108 validates the antenna 104. Otherwise, if, for the validation response 114, Equation (3) above is not satisfied, the antenna calibrator 108 (a) does not validate the antenna 104 and (b) alerts the occupants of the requesting vehicle 100 that the antenna 104 should be serviced. For example, if the RSSE is −31.6 dBm, the RSSV is −36.7 dBm, and the signal loss threshold ($TH_{SL}$) is 6 dBm, the antenna calibrator 108 may validate the antenna 104 (5.1≤6). In some examples, after not validating the antenna 104, the antenna calibrator 108 increases the transmission power of the radio of the V2X module 106.

Alternatively, in some examples, because the antennas 104 of the responding vehicles 102 may not be properly calibrated, the antenna calibrator 108 maintains a validation counter and an invalidation counter. For a particular validation response 114, if Equation (3) above is satisfied, the antenna calibrator 108 increments the validation counter. However, for the particular validation response 114, if Equation (3) above is not satisfied, the antenna calibrator 108 increments the invalidation counter. In some examples, if the validation response 114 is from the RSU 110, the appropriate one of the counters is incremented by a value greater than the value when the validation response 114 is from the responding vehicles 102. Further, in some examples, the value by which the appropriate one of the counters is incremented is based on the date at which the RSU 110 was calibrated (e.g., a greater value for being closer to the calibration date, etc.) In such a manner, the validation response 114 from recently calibrated RSUs 110 may have more weight than validation responses 114 form the responding vehicles 102.

After a period of time has elapsed and/or a threshold number of validation responses 114 have been received from the responding vehicles 102 and/or the RSUs 110, the antenna calibrator 108 calculates a success ratio of the value of the validation counter to the combined values of the validation counter and the invalidation counter. If the success ratio satisfies (e.g., is greater than or equal to) a success threshold, then the antenna calibrator 108 validates the antenna 104. If the success ratio does not satisfy the success threshold, the antenna calibrator 108 (a) does not validate the antenna 104 and (b) alerts the occupants of the requesting vehicle 100 that the antenna 104 should be serviced.

In some examples, the V2X module 106 broadcasts messages at different broadcast power levels based on, for example, a type of message (e.g., a public safety message, a private service message, etc.) to be broadcast. For example, the V2X module 106 may transmit messages at three levels of power: a high power level (e.g., 20 dBm), a middle power level (e.g., 12 dBm), a low power level (e.g., −8 dBm). In some such examples, the antenna calibrator 108 repeats the validation process disclosed to calculate a success ratio for each of the power levels. In such examples, if any of the success ratios do not satisfy the success threshold, the antenna calibrator 108 (a) does not validate the antenna 104 and (b) alerts the occupants of the requesting vehicle 100 that the antenna 104 should be serviced.

Figure 2:
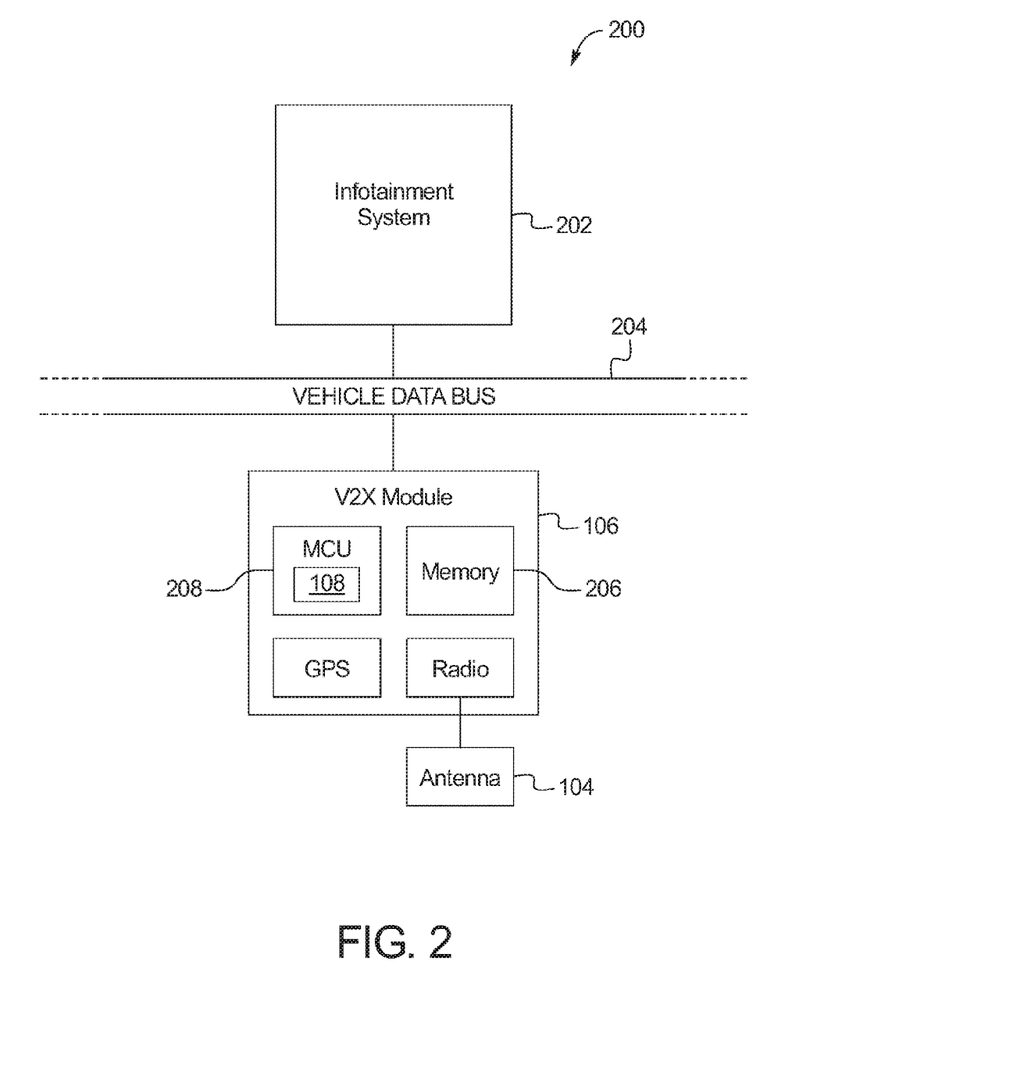
FIG. 2 is a block diagram of electronic components of the vehicles of FIG. 1.

FIG. 2 is a block diagram of electronic components 200 of the vehicles 100 and 102 of FIG. 1. In the illustrated example, the electronic components 200 include the antenna 104, the V2X module 106, an infotainment head unit 202, and a vehicle data bus 204.

The V2X module 106 includes a memory 206 and a processor or controller 208. In the illustrated example, the processor or controller 208 is structured to include antenna calibrator 108. The processor or controller 208 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 206 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 206 includes multiple kinds of memory, particularly volatile memory and non-volatile memory.

The memory 206 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 206, the computer readable medium, and/or within the processor 208 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 202 provides an interface between the vehicle 100 and 102 and a user. The infotainment head unit 202 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include dashboard instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In some examples, the infotainment head unit 202 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 202 displays the infotainment system on, for example, the center console display. When the antenna calibrator 108 determines invalidates the antenna 104, the antenna calibrator 108 may instruct an alert be displayed on the center console display and/or the dashboard instrument cluster.

The vehicle data bus 204 communicatively couples the V2X module 106 and the infotainment head unit 202. In some examples, the vehicle data bus 204 includes one or more data buses. The vehicle data bus 204 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
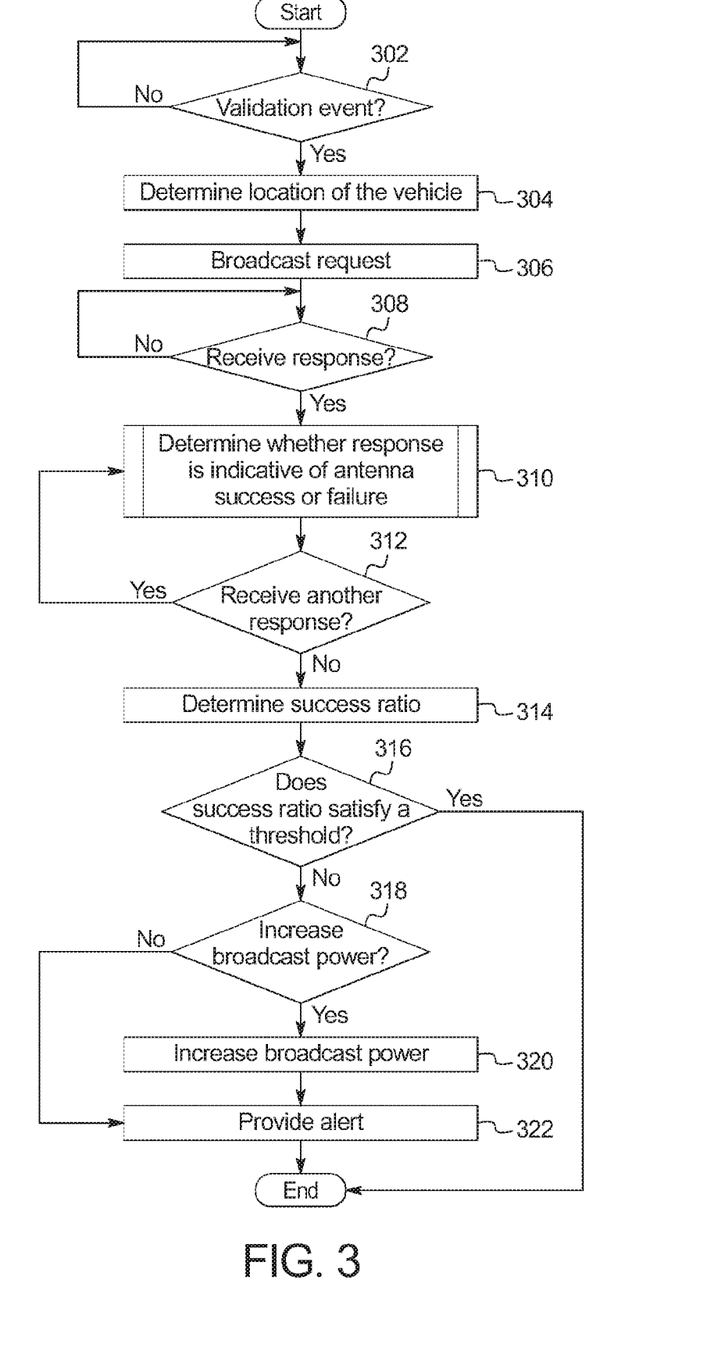
FIG. 3 is a flowchart of a method to validate the antennas of the vehicles of FIG. 1, which may be implemented by the electronic components of FIG. 2.

FIG. 3 is a flowchart of a method to validate the antennas 104 of the vehicles 100 and 102 of FIG. 1, which may be implemented by the electronic components 200 of FIG. 2. Initially, at block 302, the antenna calibrator 108 waits for a validation event. In some examples, the validation event is (a) an elapse of a period of time (e.g., a week, a month, six months, etc.) and/or (b) a mileage (e.g., 3,000 miles, 10,000 miles, etc.). At block 304, the antenna calibrator 108 determines the location (e.g., the coordinates) of the vehicle 100 (e.g., from the GPS receiver of the V2X module 106). At block 306, the antenna calibrator 108 broadcasts the validation request 112 with the identifier of the vehicle 100. At block 308, the antenna calibrator 108 waits until at least one validation response 114 is received.

At block 310, the antenna calibrator 108 determines whether the validation response 114 is indicative of a success or failure of the antenna 104. An example method to determine whether the validation response is indicative of a success or failure of the antenna 104 is disclosed in FIG. 4 below. At block 312, the antenna calibrator 108 determines whether it has received another validation response 114. If another validation response 114 has been received, the method returns to block 310. Otherwise, if another validation response 114 has not been received, the method continues at block 314. At block 314, the antenna calibrator 108 determines a success ratio. In some examples, the success ratio is calculated by dividing the number of validation responses 114 indicative of success of the antenna 104 by a total number of received validation responses 114. At block 316, the antenna calibrator 108 determines whether the success ratio satisfies (e.g., is greater than or equal to) the success threshold. In some examples, the success threshold is 0.70. If the success ratio satisfies the success threshold, the method ends. Otherwise, if the success ratio does not satisfy the success threshold, then method continues to block 318.

At block 318, the antenna calibrator 108 determines whether the transmission power of the radio of the V2X module 106 can be increased. In some examples, the V2X module 106 has a maximum transmission power (e.g., 28.8 dBm) at which the V2X module 106 can broadcast non-emergency messages. If the transmission power of the radio of the V2X module 106 can be increased, the method continues at block 320. For example, if the transmission power is set to 12 dBm, the V2X module 106 may increase the transmission power to 14 dBm. Otherwise, if transmission power of the radio of the V2X module 106 cannot be increased, the method continues at block 322. At block 320, the antenna calibrator 108 increases the transmission power of the radio of the V2X module 106. In some example, the increase in the transmission power is based on the average amount by which the different between the expected received signal strength (RSSE) and the received signal strength value (RSSV) is greater than the signal loss threshold ($TH_{SL}$). At block 322, the antenna calibrator 108 instructs the infotainment head unit 202 to provide an alert to the user. In some examples, when the V2X module 106 broadcasts messages at the different power levels (e.g., a maximum high level, a middle power level, and a low power level), the method of FIG. 3 may be repeated for each of the power levels.

Figure 4:
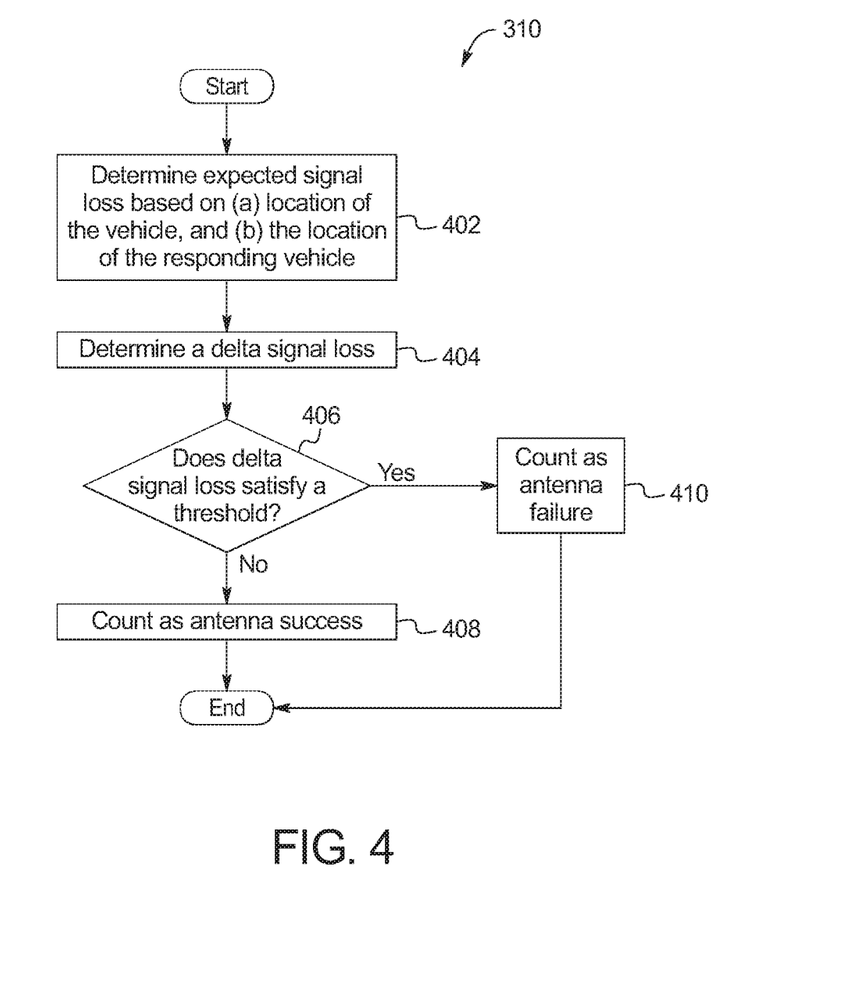
FIG. 4 is a flowchart of a method to determine the operability of the antennas of FIG. 1, which may be implemented by the electronic components of FIG. 2.

FIG. 4 is a flowchart of a method to determine the operability of the antennas 104 of FIG. 1, which may be implemented by the electronic components 200 of FIG. 2. Initially, at block 402, the antenna calibrator 108 determines the expected open path signal loss ($OSPL_E(dB)$) based on the location of the vehicle 100 and the location of the responding vehicle 102 included in the validation response 114. In some examples, the expected open path signal loss ($OSPL_E(dB)$) is determined in accordance with Equation (1) above. At block 404, the antenna calibrator 108 determines a delta signal loss (e.g., the absolute difference between the expected received signal strength (RSSE) and the received signal strength value (RSSV). At block 406, the antenna calibrator 108 determines whether the delta signal loss satisfies (e.g., is less than or equal to) the signal loss threshold ($TH_{SL}$). If the delta signal loss satisfies the signal loss threshold ($TH_{SL}$), the method continues at block 408. Otherwise, if the delta signal loss does not satisfy the signal loss threshold ($TH_{SL}$), the method continues at block 410. At block 408, the antenna calibrator 108 determines that the validation message 114 is indicative of the antenna 104 being a success (e.g., operating within expected parameters). At block 410, the antenna calibrator 108 determines that the validation message 114 is indicative of the antenna 104 being a failure (e.g., not operating within expected parameters).

Figure 5:
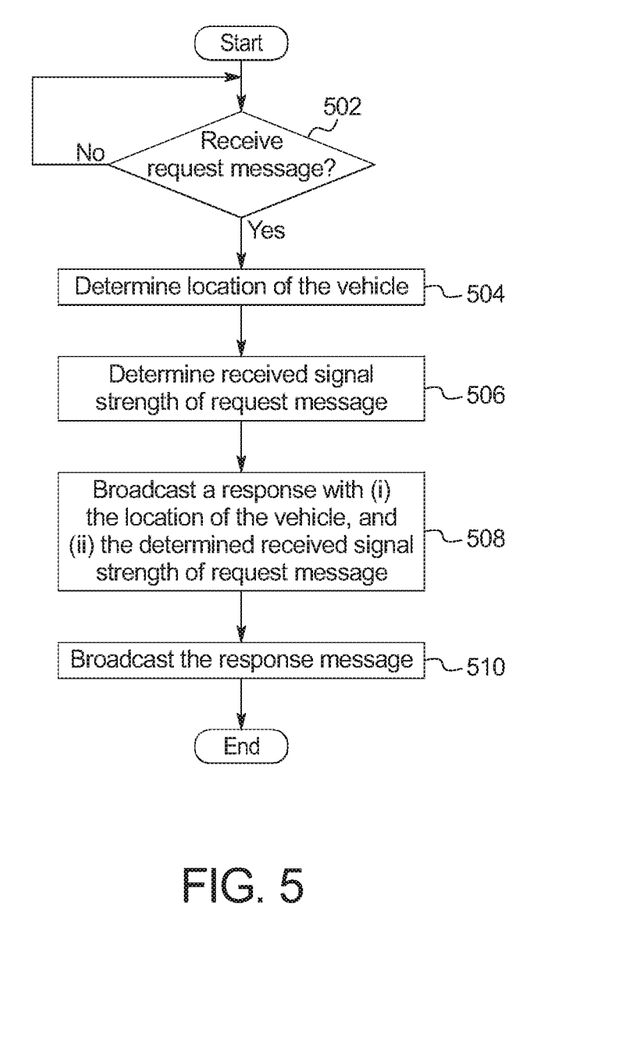
FIG. 5 is a flowchart of a method to respond to a validation request from one of the vehicles of FIG. 1, which may be implemented by the electronic components of FIG. 2.

FIG. 5 is a flowchart of a method to respond to a validation request 112 from one of the vehicles 100 of FIG. 1, which may be implemented by the electronic components 200 of FIG. 2. Initially, at block 502, the antenna calibrator 108 of the vehicle 102 waits until it receives the validation request 112 from the requesting vehicle 100. At block 504, the antenna calibrator 108 determines the location (e.g., the coordinates) of the vehicle 102 (e.g., via the GPS receiver of the V2X module 106). At block 506, the antenna calibrator 108 determines the received signal strength of the signal of the validation request 112. At block 508, the antenna calibrator 108 generates the validation response 114 with (i) the location of the vehicle 102 determines at block 504, (ii) the received signal strength determined at block 506, and (iii) the identifier included in the validation request 112. At block 508, the antenna calibrator 108 broadcasts the validation response 114 via the V2X module 106.

The flowcharts of FIGS. 3, 4, and/or 5 are representative of machine readable instructions stored in memory (such as the memory 206 of FIG. 2) that comprise one or more programs that, when executed by a processor (such as the processor 208 of FIG. 2), cause the vehicle 100 and 102 to implement the example antenna calibrator 108 of FIGS. 1 and 2. Further, although the example program(s) is/are described with reference to the flowcharts illustrated in FIG. 3, and and/or 5, many other methods of implementing the example antenna calibrator 108 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
 a wireless communication module; and
 an antenna calibrator to, for each of a plurality of validation responses received from second vehicles:
  determine an estimated received signal strength based on an estimated open path signal strength loss; and
  in response to a difference between the estimated received signal strength and an actual received signal strength from the validation response not satisfying a threshold, provide an alert to occupants of the vehicle.

2. The vehicle of claim 1, wherein the antenna calibrator is to, for each of the second vehicles, determine the estimated open path signal strength loss based on first coordinates of the vehicle and second coordinates of the second vehicle.

3. The vehicle of claim 1, wherein the antenna calibrator is to broadcast, using the wireless communication module, multiple validation request messages with an identifier that identifies the vehicle, each one of the validation request messages having a different transmission power.

4. The vehicle of claim 3, wherein to determine the estimated received signal strength for the validation messages, the antenna calibrator is to subtract a cable loss from and add the estimated open path signal strength loss to the corresponding transmission power.

5. The vehicle of claim 1, wherein:
 when the difference between the estimated received signal strength and the actual received signal strength from the validation response satisfies the threshold, the antenna calibrator is to increment a first counter associated with a number of validation responses indicative of success and a second counter associated with a total number of validation responses; and
 when the difference between the estimated received signal strength and the actual received signal strength from the validation response does not satisfy the threshold, the antenna calibrator is to increment the second counter.

6. The vehicle of claim 5, wherein after comparing the difference between the estimated received signal strength and the actual received signal strength for each of the validation responses, the antenna calibrator is to determine a success ratio by dividing the number of validation responses indicative of success and the total number of validation responses received.

7. The vehicle of claim 6, wherein, in response to the success ratio not satisfying a second threshold, the antenna calibrator is to:
provide the alert to occupants of the vehicle; and
increase a transmission power of the wireless communication module if the transmission power is below a maximum allowed power limit.

8. A method to test an antenna of a vehicle-to-vehicle communication module, comprising:
receiving a validation response from a plurality of vehicles;
for each of the validation responses, determining, with a processor, an estimated received signal strength based on an estimated open path signal strength loss; and
in response to a difference between the estimated received signal strength and an actual received signal strength from one of the validation responses not satisfying a threshold, providing an alert to occupants of the vehicle.

9. The method of claim 8, including for each of the validation responses determining the estimated open path signal strength loss based on first coordinates of the antenna and second coordinates of one of the plurality of vehicles.

10. The method of claim 8, including broadcasting, using the vehicle-to-vehicle wireless communication module and a transmission power, a validation request message with an identifier that identifies the vehicle.

11. The method of claim 10, wherein determining the estimated received signal strength includes subtracting a cable loss from and adding the estimated open path signal strength loss to the transmission power.

12. The method of claim 8, including:
incrementing a first counter associated with a number of validation responses indicative of success and a second counter associated with a total number of validation responses when the difference between the estimated received signal strength and the actual received signal strength from the validation response satisfies the threshold; and
incrementing the second counter when the difference between the estimated received signal strength and the actual received signal strength from the validation response does not satisfy the threshold.

13. The method of claim 12, including, after comparing the difference between the estimated received signal strength and the actual received signal strength for each of the validation responses, determining a success ratio by dividing the number of validation responses indicative of success and the total number of validation responses received.

14. The method of claim 13, including, in response to the success ratio not satisfying a second threshold:
providing the alert to occupants of the vehicle; and
increasing a transmission power of the vehicle-to-vehicle wireless communication module.

15. A system comprising:
a plurality of first vehicles, each one of the plurality of first vehicles to, in response to receiving a validation request message, broadcast a validation response message including first coordinates and a received signal strength value of the validation request message; and
a second vehicle to:
from time to time, determine second coordinates of the second vehicle and send the validation request message; and
for each of the received validation responses messages, determine an indication of operational status of an antenna of the second vehicle based on the second coordinates, the first coordinates, and the received signal strength value.

16. The system of claim 15, wherein, based on the indications of operational status of the antenna determined from the received validation responses messages from the plurality of first vehicles, the second vehicle is to determine whether the antenna is malfunctioning.

17. The system of claim 15, include a roadside unit to, in response to receiving the validation request message, broadcast the validation response message including first coordinates of the roadside unit and the received signal strength value of the validation request message.

18. The system of claim 17, wherein, based on the indications of operational status of the antenna determined from the received validation responses messages from the plurality of first vehicles and the roadside unit, the second vehicle is to determine whether the antenna is malfunctioning.

19. The system of claim 18, wherein the indication of operational status of the antenna determined from the roadside unit is weighted more than the indications of operational status of the antenna determined from the plurality of first vehicles.

* * * * *